W. E. SPARKS.
Latch.
No. 228,569.  Patented June 8, 1880.
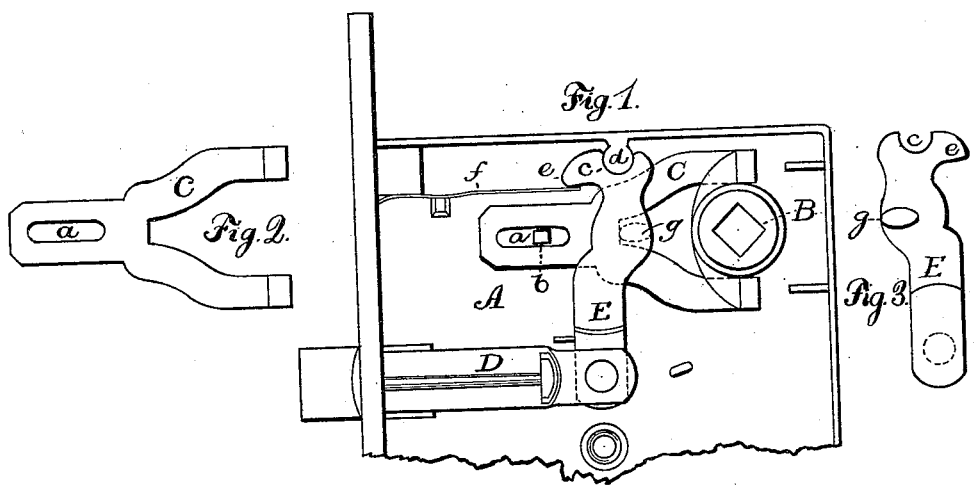
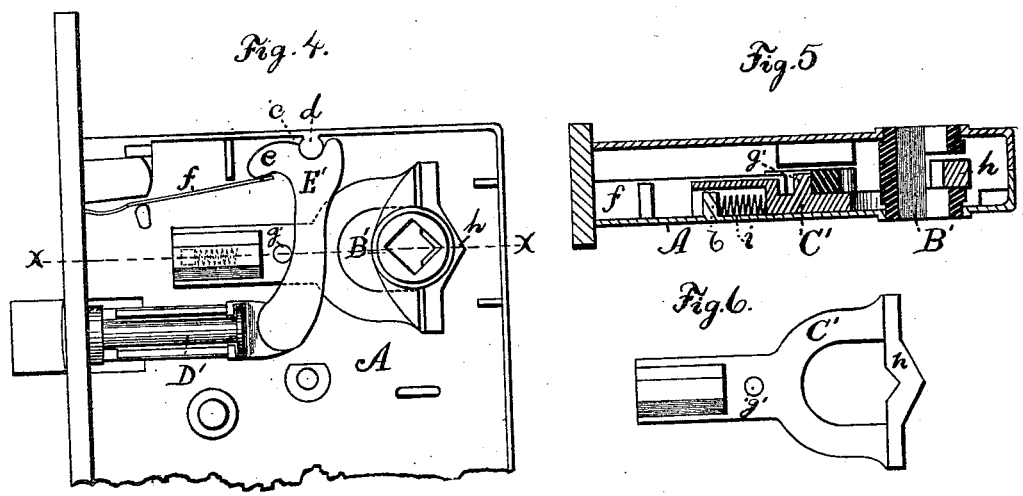

UNITED STATES PATENT OFFICE.

WILLIAM E. SPARKS, OF NEW BRITAIN, CONNECTICUT, ASSIGNOR TO
P. & F. CORBIN, OF SAME PLACE.

LATCH.

SPECIFICATION forming part of Letters Patent No. 228,569, dated June 8, 1880.

Application filed January 8, 1880.

*To all whom it may concern:*

Be it known that I, WILLIAM E. SPARKS, of New Britain, in the county of Hartford and State of Connecticut, have invented certain new and useful Improvements in Knob-Latches, of which the following is a specification.

My invention relates to knob-latches in which a horseshoe or slide, acted upon by the arms of the hub in the ordinary manner, has its rear ends connected by a notched bar and operates in combination with a slotted hub, also in which a lever, reciprocating horseshoe, and latch operate together when moving through the hub, and independently when moved through the latch-bolt and striker; and the objects of my invention are, first, to facilitate the reversal of the latch in a cheap and simple manner; and, second, to cause the independent movement of the latch-bolt in the combination shown without moving the horseshoe. I attain these objects by the mechanism illustrated in the accompanying drawings, in which—

Figure 4 is a front elevation with the front plate of the case removed in order to better show the parts. Fig. 5 is a section of the same on line $x\,x$ of Fig. 4. Fig. 6 is a front elevation of the horseshoe belonging thereto. Fig. 1 is a front elevation, showing only one part of my invention; and Figs. 2 and 3 are front and rear views, respectively, of the horseshoe and lever belonging to the latch shown in Fig. 1.

A designates the case of the latch; B', the hub, slotted at its rear, as in prior reversible latches. C' designates the horseshoe or slide, the rear ends of which are connected by a transverse bar, $h$, having a V-shaped notch upon the middle of its inside, as shown most clearly in Figs. 4 and 6. The slot in the rear of the hub B' is of such width as to admit the transverse bar $h$ into the hub, and the V-shaped notch substantially coincides in position with the spindle-hole through the hub, so that when the spindle is inserted the horseshoe cannot be pulled forward.

The front end of the horseshoe C' is grooved upon its under side to receive the spring $i$, and also the stud $b$ on the case, which guides that end of the horseshoe in its sliding longitudinal movement. The spring $i$ also bears against this stud, and has a tendency to force the horseshoe inward or toward the hub. The horseshoe is also provided with a pin, $g'$.

A lever, E', is pivoted to the case A by means of the stud $d$, which lever is provided with a short arm, $e$, against which the spring $f$ bears. The main portion or long arm of this lever extends over the front end of the horseshoe, and just back of the pin $g'$, to the swiveled latch-bolt D', and is connected thereto by a hinge or joint. This swiveled latch-bolt D' may be of any ordinary construction.

When the spindle is not in place the latch-bolt D' may be pulled forward and reversed in a well-known manner, so far as pulling out and turning it over are concerned, after which the spring $i$ causes the parts to return to the position represented in the drawings. When the spindle is in place the transverse bar $h$ on the horseshoe comes in contact with the spindle and prevents the latch-bolt from being pulled forward far enough the reverse it.

The feature of having the knob-spindle prevent the latch-bolt from being drawn forward for reversal is quite old in many reversible latches, but not by contact with a bar on the horseshoe or slide, which slide also engages the arms of the hub.

When the parts are operated through the medium of the knob-spindle they all move together and with a stiff and steady pull. When the parts are operated under the influence of the striker or anything acting upon the end of the bolt the latch-bolt, lever, and spring only are moved, and the bolt is what is termed "easy-acting," for two reasons: first, because a greater leverage is obtained against the power of the spring $f$ than in the former case; and, second, because the horseshoe or slide is not moved, and consequently less power is required to force the bolt inward than there would be in case the lever was pivoted to the horseshoe and the latter moved inward with it.

Although I have designed my invention for use in a reversible latch, it is evident that this last feature may be employed either in a reversible or non-reversible latch. An embodiment of this part of the invention in a non-reversible latch is shown in Figs. 1, 2, and 3. Corresponding parts are designated by the same letters of reference as in the other figures, but without the character 1 affixed thereto, while parts which are exactly the same have the same reference-letters.

In Figs. 1, 2, and 3 the latch-bolt D does not swivel, the horseshoe or slide and the lever are connected by a stud, $g$, on the lever instead of one on the horseshoe, (a mere reversal of the parts,) the hub is not slotted, and the horseshoe or slide has no transverse bar; but their operation, so far as their relative movements under the influence of the knob-spindle and striker, respectively, is concerned, is precisely the same as the parts before described, and represented in the other figures of the drawings.

I am aware of the latch shown in the patent to W. S. Kirkham, No. 30,580, dated November 6, 1860, and I hereby disclaim the same. In the latch represented by Figs. 1, 2, and 3 of the drawings in said patent the lever is pivoted to the horseshoe or slide, so that it differs from my latch by necessitating a movement of the horseshoe with the lever when moved in either direction. The horseshoe shown therein also has a transverse bar connecting its rear ends; but said bar has no notch of V shape and is not employed in combination with a slotted hub.

I am also aware that various forms of reversible latches have been made or patented, some of which had a third element in combination with the horseshoe or slide and a slotted hub. In one instance the third element, to which the latch-bolt was swiveled, was in the form of a horseshoe with a transverse bar connecting its rear or toe ends; but this horseshoe-piece was not acted upon by the arms of the hub, and did not perform the functions of the ordinary horseshoe or slide. All of said prior devices are disclaimed.

I claim as my invention—

1. In a reversible latch, the combination of the following elements, viz: first, the horseshoe or slide adapted for engagement with the arms of the hub in the ordinary manner, and having, also, the notched transverse bar $h$ connecting its rear ends; second, the slotted hub; third, the latch-bolt; and, fourth, suitable connecting mechanism, substantially as described, and for the purpose specified.

2. The combination, in a latch, of the following elements, viz: first, the hub; second, the horseshoe; third, the lever pivoted to the latch-case and connected to the front end of the horseshoe by a pin upon one member which acts against but does not take into the other, so as to allow the free movement of the lever backward independent of the horseshoe; fourth, the latch-bolt; and, fifth, the spring for acting upon the short arm of the lever, substantially as described, and for the purpose specified.

WILLIAM E. SPARKS.

Witnesses:
CHARLES PECK,
E. L. PRIOR.